(12) United States Patent
Pew et al.

(10) Patent No.: US 6,856,420 B1
(45) Date of Patent: Feb. 15, 2005

(54) SYSTEM AND METHOD FOR TRANSFERRING DATA WITHIN A PRINTER

(75) Inventors: Frederick W. Pew, Boise, ID (US); Marvin D. Nelson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 863 days.

(21) Appl. No.: 09/631,036

(22) Filed: Jul. 31, 2000

(51) Int. Cl.[7] .......................... G06F 15/00; G06K 1/00; G06K 15/02
(52) U.S. Cl. ...................... 358/1.16; 358/1.17; 711/203; 711/206; 711/209; 710/9; 710/110
(58) Field of Search .............................. 358/1.16, 1.17; 710/9, 110; 711/203, 206, 209, 146, 211

(56) References Cited

U.S. PATENT DOCUMENTS

| | | | |
|---|---|---|---|
| 4,453,211 A | * 6/1984 | Askinazi et al. | 703/24 |
| 4,694,395 A | * 9/1987 | Young et al. | 711/206 |
| 5,029,070 A | * 7/1991 | McCarthy et al. | 711/143 |
| 5,146,547 A | * 9/1992 | Beck et al. | 358/1.17 |
| 5,355,441 A | * 10/1994 | Kawai et al. | 358/1.16 |
| 5,579,452 A | * 11/1996 | Ambalavanar et al. | 358/1.16 |
| 5,805,930 A | 9/1998 | Rosenthal et al. | 395/877 |
| 5,978,892 A | 11/1999 | Noel et al. | 711/170 |
| 6,049,854 A | 4/2000 | Bedarida | 711/153 |

OTHER PUBLICATIONS

Patterson, David A., and John,L. Hennessy. Computer Architecture: a quantitative approach, 2nd ed.. Morgan Kaufmann Publishers, Inc.: San Francisco, CA, 1996, p. 527.

Patterson, David A., and John L. Hennessy. Computer Organization and Design: the Hardware/software interface, 2nd ed. Morgan Kaufmann Publishers, Inc.: San Francisco, CA, 1998, pp 682–683.

Definition for "Memory Management Unit" from "Free On–line Dictionary of computing", http://wombat.doc.i-c.ac.uk/foldoc/foldoc.cgi?query=mmu&action=Search (date site consulted: Jul. 24, 2000).

* cited by examiner

*Primary Examiner*—Edward Coles
*Assistant Examiner*—David L Jones
(74) *Attorney, Agent, or Firm*—Matthew L. Wade

(57) ABSTRACT

A printer is described. The printer includes a CPU, a DMA controller and an internal memory. The CPU and the DMA controller are each connected to a first memory bus. The internal memory is connected to a second memory bus. The printer further included an address translation unit connected to both the first and the second memory bus. The address translation operates to receive virtual addresses from both the CPU and the DMA controller over the first memory bus and translates these virtual addresses into physical addresses. The address translation unit transmits the physical addresses to the memory over the second memory bus.

9 Claims, 3 Drawing Sheets

SYSTEM AND METHOD FOR TRANSFERRING DATA WITHIN A PRINTER

BACKGROUND OF THE INVENTION

It is well known that many printers include a CPU and a memory management unit (MMU) which are both located on the same integrated circuit (IC). The MMU operates to translate virtual addresses (generated by processes being executed by the CPU) into physical addresses. By using virtual memory, a contiguous range of virtual addresses can be mapped to several non-contiguous areas of physical memory. The phrase "virtual address space" is the range of virtual addresses that is provided by the MMU. Typically, the virtual address space is divided into "virtual pages" which are of a pre-determined size.

Printers often provide for "direct memory access (DMA)" transfers to or from the printer's internal memory. In this context, DMA transfers refer to the process of transferring data (e.g., page description commands describing a document) to or from the printer's internal memory without intervention from the printer's central processor unit (CPU). Instead, the DMA transfers are (typically) implemented by a special purpose controller (referred to as a "DMA" controller) that resides within the printer.

During a DMA transfer, the DMA controller operates as a "bus master". A bus master refers to a device capable of asserting control over a bus. As part of this function, the DMA controller causes addresses to be placed on the bus to address the printer's internal memory.

Some printers that make use of virtual memory include a DMA controller that only works with physical addresses. This can present a problem, as the printer's internal memory may become fragmented due to contiguous virtual memory addresses being mapped to non-contiguous areas in the physical memory.

One solution to this problem is to constrain each DMA transfer to within a single virtual page. Unfortunately, this solution reduces the amount of data that can be transferred during any one DMA transfer. As a result, multiple DMA transfers may be required to transfer a given amount of data. This is especially disadvantageous for printers (as opposed to other general purpose computers) since printers often perform DMA transfers of relatively large amounts of data which often exceeds the size of a typical virtual page.

Some general purpose computers include DMA controllers that work with virtual memory. An example of such a computer is given in *Computer Architecture: a Quantitative Approach*, page 527, by David A. Patterson and John L. Hennessy, $2^{nd}$ ad., ISBN 1-55860-372-7. Typically, this type of DMA controller is provided with an associated set of registers. The registers are used to store a small number of virtual to physical address mappings. Prior to a DMA transfer, the computer's CPU stores the mappings in the register. The mappings are then used by the DMA controller, during a DMA transfer, to translate virtual addresses into physical addresses. Unfortunately, this implementation adds complexity and overhead which is associated with the registers and the operation of the CPU to update these registers prior to each DMA transfer. Implementing this solution in a printer, therefore, results in adding overhead, complexity and therefore cost to the printer.

SUMMARY OF THE INVENTION

Briefly, and in general terms, a printer according to a preferred embodiment of the invention includes a first address bus, a second address bus and an address translation unit (ATU). The ATU is coupled to the first and second address buses and is operable to translate virtual addresses received from at least two bus masters connected to the first bus into physical memory addresses and to transmit these physical addresses over the second bus to a memory. One of the bus masters may be a CPU, the other bus master may be a DMA controller.

In another embodiment, a printer is provided that includes a DMA controller operable to generate virtual addresses, a CPU operable to generate virtual addresses and a memory. The printer further includes an address translation unit operable to receive the virtual addresses from both the DMA controller and the CPU and to translate the virtual addresses into physical addresses. The ATU then transmits the physical addresses to the memory.

The present invention may also be implemented as a method of generating physical addresses in a printer. The printer including a CPU, a DMA controller and a memory. The method preferably includes providing an address translation unit (ATU), the CPU transmitting a first plurality of virtual addresses to the ATU, and the DMA controller transmitting a second plurality of virtual addresses to the ATU. The method may further include the ATU generating physical addresses from the virtual addresses received from the CPU and then transmitting these physical addresses to the memory. In addition, the method may further include the ATU generating physical addresses received from the DMA controller and then transmitting these physical addresses to the memory.

The present invention may also be implemented as a computer. The computer includes a DMA controller, a CPU, an ATU and a memory. The address translation unit is operable to receive virtual addresses from both the DMA controller and the CPU, to translate the virtual addresses into physical addresses and to transmit the physical addresses to the memory.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
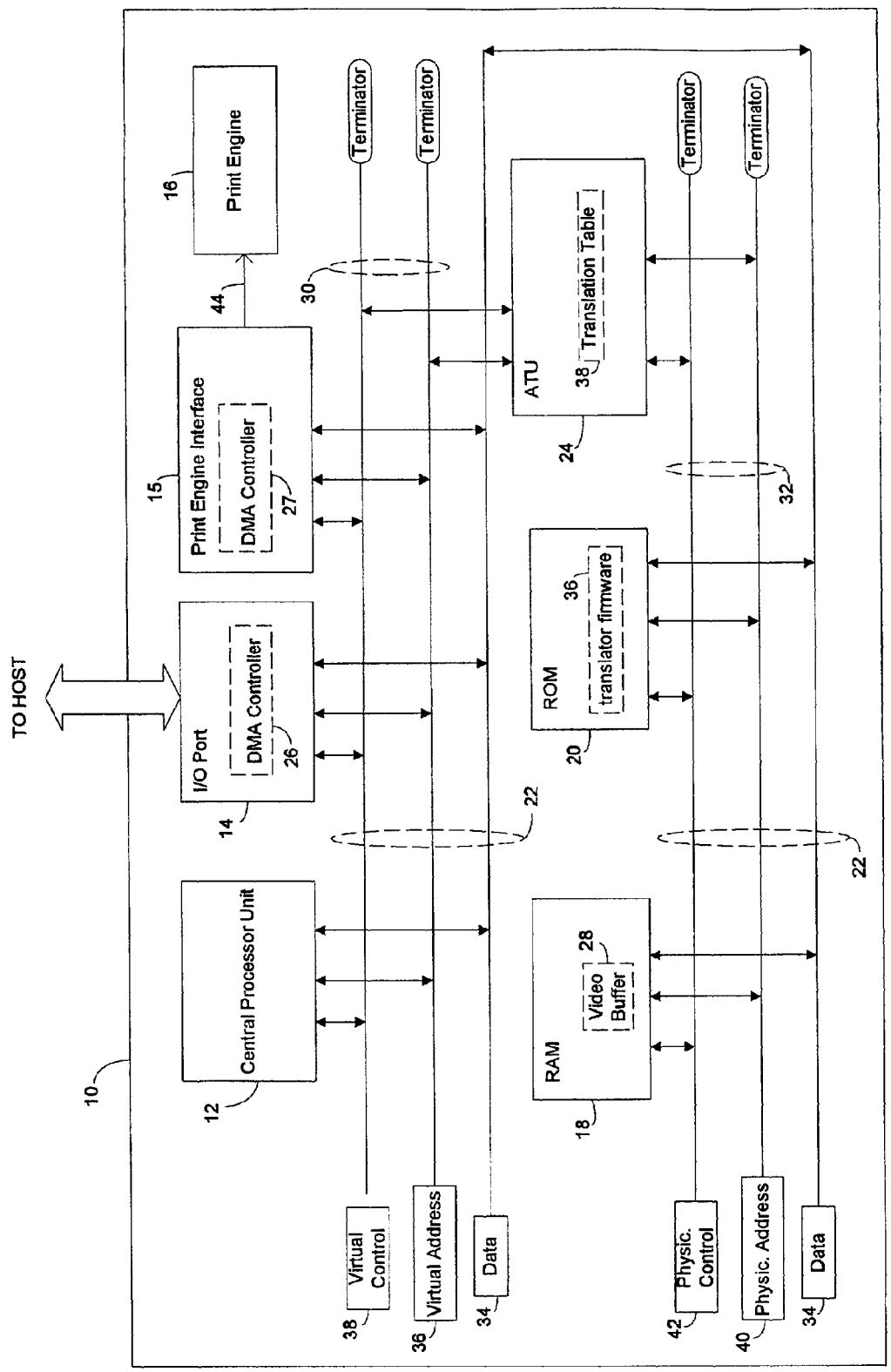
FIG. 1 is a high level schematic of a printer constructed according to one embodiment of the invention.

FIG. 1 is a high level schematic of a printer 10 constructed according to one preferred embodiment of the invention. As shown, the printer 10 includes a CPU 12, an I/O port 14, a print engine interface 15, a print engine 16, a random access memory (RAM) 18, a read only memory (ROM) 20 and a bus system 22. The I/O port 14 includes a first DMA controller 26, the print engine interface 15 includes a second DMA controller 27 and the RAM 18 includes a video buffer 28.

In addition, and in accordance with the invention, the printer 10 includes an "address translation unit" (ATU) 24.

The ATU 24 operates to translate virtual addresses into physical (i.e., actual) memory addresses. As will be discussed in greater detail below, the ATU 14 allows the CPU 12, the first DMA controller 26 and the second DMA controller 27 to all operate in a virtual address space.

As shown, the bus system 22 includes a "virtual" memory bus 30, a "physical" memory bus 32 and a single data bus 34. Each of these two memory buses include respective control lines 38, 42 and address lines 36, 40. As will be described in greater detail below, the virtual memory bus 30 is used as a communication path for virtual addresses. These virtual addresses may be transmitted from the CPU 12, the first DMA controller 26 or the second DMA controller 27 and are received by the ATU 24. The physical memory bus 32 is used as a communication path for physical addresses which are transmitted from the ATU 24.

The CPU 12, the I/O port 14 and the print engine interface 15 are all connected to the virtual memory bus 30. The RAM 18 and the ROM 20 are both connected to the physical memory bus 32. The ATU 24 is connected to both the virtual memory bus 30 and the physical memory bus 32. In addition, the CPU 12, the I/O port 14, the print engine interface 15, the RAM 18 and the ROM 20 are each connected to the data bus 34. The print engine interface 15 is connected to the print engine 16 by a video bus 44. The video bus 44 may be a serial type connection.

The I/O port 14 is used to facilitate DMA transfers of data transmitted from an external host to the RAM 18. This data may represent page description language (PDL) commands that describe a document to be printed. As will be described in greater detail below, the DMA controller 26 operates to direct these DMA transfers.

The CPU 12 is used to execute programs stored in the ROM 20. These programs provide the printer 10 with various control and image processing facilities. For example, one or more of these programs may direct the CPU 12 to process the PDL commands received over the I/O port 14 in order to generate video data. The CPU 12 may also operate to store the video data in the video buffer 28.

The print engine interface 15 is used to coordinate, control and buffer the DMA transfer of video data from the video buffer 28 to the print engine 16 during the printing of a document. Importantly, during this operation, the second DMA controller 27 directs the DMA transfer of the video data over the data bus 34. Additionally, the print engine interface 15 transmits the video data over the video bus 44 to the print engine 16.

It is noted that the first DMA controller 26, the second DMA controller 27 and the CPU 12 can operate as a bus master over the virtual memory bus 30 in order to write or read data from the RAM 18.

Importantly, the function of the ATU 24 is to allow the CPU 12, the first DMA controller 26 and the second OMA controller 27 to operate in a virtual address space. To accomplish this, the ATU 24 operates to map virtual addresses transmitted over the virtual memory bus 30 into physical addresses. Importantly, the virtual addresses may be transmitted from the CPU 12, the first DMA controller 26 or the second DMA controller 27.

After the physical address is generated, the ATU 24 places the physical address, along with appropriate control signals, on the physical memory bus 32. The ATU 24 may also provide various other memory control functions such as memory chip selection and address multiplexing.

In the present embodiment, the ATU 24 includes a translation table 38. The translation table 38 is a single data structure that includes mappings of virtual to physical addresses. Importantly, the translation table 38 provides mappings for the entire virtual address space available in the printer 10. The translation table 38 is maintained by a single firmware program 36 which is shown stored in the ROM 20 and is executed by the CPU 12.

Figure 2:
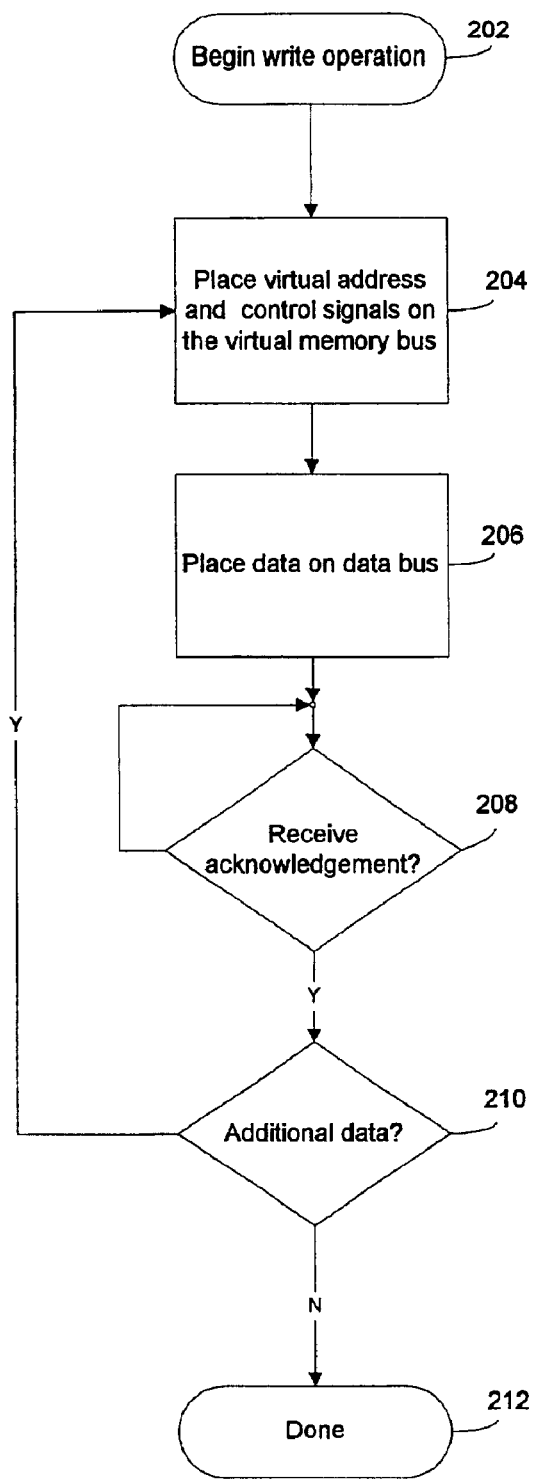
FIG. 2 is a flow diagram illustrating the operation of the printer's CPU and the printer's DMA controller to write data to the printer's internal memory.

FIG. 2 is a flow diagram illustrating the operation of the CPU 12 and the DMA controllers to write data to the RAM 18. For ease of discussion, the steps in FIG. 2 are explained with reference to a "virtual bus master". It is understood that the virtual bus master is the present device (i.e., the CPU 12 or one of the DMA controllers) driving the virtual address bus 30.

As shown in FIG. 2, at the beginning of a write operation (step 202), the virtual bus master places a virtual address and appropriate control signals over the virtual address bus 30 (step 204). Next, the virtual bus master places the data on the data bus 34 (step 206). The virtual bus master then waits until an acknowledgment signal is received (step 208). As will be discussed below, this signal is generated by the ATU 24. Next, the bus master determines if there is additional data to write (step 210). If so, then the steps 204–210 are repeated. This operation continues until the write operation is complete (step 204). A read operation is performed in a similar manner.

Figure 3:
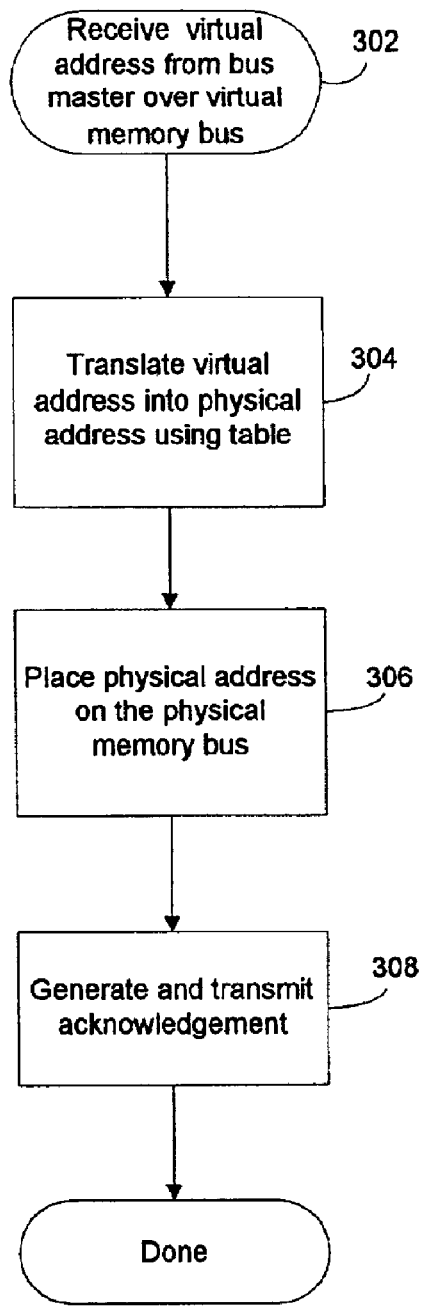
FIG. 3 is a flow diagram illustrating the operation of the Address translation unit (ATU) to translate virtual addresses into physical addresses.

FIG. 3 is a flow diagram illustrating the operation of the ATU 24 to translate virtual addresses received over the virtual memory bus 30 (from the present virtual bus master) into physical addresses.

Referring now to FIG. 3, the ATU 24 receives the virtual address from the virtual bus master over the virtual memory bus 30 at step 302. In response, the ATU 24 operates to translate the virtual address into a physical address (step 304). This is accomplished by using the translation table 38. After the physical address is generated, the ATU 24 then places the physical address onto the physical memory bus 32 to address the RAM 18 (step 306). The ATU 24 then operates to generate an acknowledgment signal (step 308) for the virtual bus master (see step 208, FIG. 2). The acknowledgment signal is transmitted appropriately over the virtual control lines.

From the foregoing it will be appreciated that a printer constructed according to the invention offers numerous advantages. First, both the CPU and the printer's DMA controllers operate in a virtual address space and both have access to the entire virtual address space. This significantly simplifies the operation of these components. Second, the task of mapping the virtual addresses (generated by these components) is now centralized and the mappings are maintained in a single data structure (i.e., the translation table). This significantly simplifies the book keeping task associated with ensuring correct physical addresses are generated. Third, by allowing the DMA controllers to operate with virtual addresses, more efficient use of the RAM can be achieved as DMA transfers can be mapped into non-contiguous areas of the RAM.

It is further noted that the present invention may also be embodied in the form of a program storage medium with computer readable program code embodied therein that represents the ATU firmware. In the context of this document, "program storage medium" can be any means that can contain, store, communicate, propagate, or transport the program for use by or in connection with an instruction execution system, apparatus or device. The program storage medium can be, for example (the following is a non-exhaustive list), a magnetic, optical, or semiconductor based storage device.

Although a specific embodiments of the invention has been described and illustrated, the invention is not to be limited to the specific forms or arrangements of parts so described and illustrated. For example, the invention has been shown to have particular applicability to a printer. The invention, however, may be used to improve other types of computing systems. Therefore, the invention is limited only by the claims and equivalents thereof.

What is claimed is:

1. A printer, comprising:

a virtual memory address bus;

a plurality of bus masters comprising a central processing unit, an input/output port and a print engine interface coupled to the virtual memory address bus;

a physical memory address bus;

a printer memory coupled to the physical memory address bus; and an address translation unit coupled to the virtual memory and physical memory address buses, the address translation unit operable to translate virtual addresses received from the bus masters over the virtual memory bus into physical memory addresses.

2. The printer of claim 1, wherein the address translation unit is further operable to transmit physical memory addresses over the physical memory address bus.

3. The printer of claim 2, wherein one of the bus masters comprises a direct memory access controller associated with a print engine interface, and the printer further comprising a print engine coupled to the print engine interface.

4. The printer of claim 3, wherein one of the bus masters comprises the central processing unit coupled to the virtual memory address bus.

5. The printer of claim 4, wherein another of the bus masters comprises a direct memory access controller associated with the input/output port coupled to the virtual memory address bus.

6. The printer of claim 1, wherein the address translation unit is operable to translate virtual addresses received over the virtual memory address bus into physical addresses for addressing the printer memory and to then transmit these physical addresses to the memory over the physical memory address bus.

7. A printer, comprising:

a virtual memory address bus;

a physical memory address bus;

a central processing unit coupled to the virtual memory address bus;

an input/output port having a first direct memory access controller coupled to the virtual memory address bus, the first direct memory access controller operable to manipulate data using virtual memory addresses;

a print engine interface having a second direct memory access controller coupled to the virtual memory address bus, the second direct memory access controller operable to manipulate data using virtual memory addresses;

a print engine coupled to the print engine interface;

a printer memory coupled to the physical memory address bus, the memory operable to store data using physical memory addresses; and an address translation unit coupled between the virtual memory address bus and to the physical memory address bus, the address translation unit operable to translate between virtual memory addresses and physical memory addresses.

8. The printer of claim 7, wherein:

the address translation unit includes a translation table mapping virtual memory addresses to corresponding physical memory addresses; and the printer memory comprises read only memory storing a translator program that when executed by the central processing unit maintains the translation table.

9. A printer, comprising:

a central processing unit, an input/output port and a print engine interface operable in a virtual memory address space;

a memory operable in a physical memory address space; and a translator operatively coupled between the memory and the central processing unit, input/output port and print engine interface, the translator operable to translate virtual memory addresses from the virtual memory address space into physical memory addresses for the physical memory address space.

* * * * *